United States Patent
Mase et al.

(10) Patent No.: US 6,686,835 B2
(45) Date of Patent: Feb. 3, 2004

(54) REAR WHEEL STEERING ANGLE CONTROL APPARATUS

(75) Inventors: Hisayasu Mase, Nisshin (JP); Katsuhiko Sato, Nagoya (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 118 days.

(21) Appl. No.: 10/107,349

(22) Filed: Mar. 28, 2002

(65) Prior Publication Data

US 2002/0161500 A1 Oct. 31, 2002

(30) Foreign Application Priority Data

Mar. 28, 2001 (JP) .......................... 2001-093468

(51) Int. Cl.[7] .............................. B60Q 1/00
(52) U.S. Cl. ................. 340/438; 340/635; 340/679; 701/43; 180/404; 180/408; 180/410; 180/423
(58) Field of Search .................... 340/425.5, 438, 340/439, 440, 441, 459, 679, 686.1, 686.2, 686.3, 671, 672, 635; 701/43, 41, 44, 42; 180/412, 404, 408, 409, 411, 410, 421, 423, 445, 415

(56) References Cited

U.S. PATENT DOCUMENTS

| | | | | |
|---|---|---|---|---|
| 4,840,243 A | * | 6/1989 | Hirabayashi et al. | 180/415 |
| 4,926,955 A | * | 5/1990 | Ohmura et al. | 180/414 |
| 4,934,474 A | * | 6/1990 | Sugasawa | 180/414 |
| 4,953,648 A | * | 9/1990 | Ohmura | 180/445 |
| 4,953,650 A | * | 9/1990 | Ohmura | 180/412 |
| 4,976,328 A | * | 12/1990 | Ohmura | 180/412 |
| 5,048,627 A | * | 9/1991 | Eguchi et al. | 480/415 |
| 5,101,922 A | * | 4/1992 | Ohmura | 180/445 |
| 5,156,227 A | * | 10/1992 | Taniguchi et al. | 180/404 |
| 5,253,172 A | * | 10/1993 | Ito et al. | 701/41 |
| 5,295,550 A | * | 3/1994 | Chikuma | 180/412 |
| 5,400,250 A | * | 3/1995 | Ohmura | 701/43 |
| 5,457,632 A | * | 10/1995 | Tagawa et al. | 701/43 |
| 6,219,604 B1 | * | 4/2001 | Dilger et al. | 701/41 |

FOREIGN PATENT DOCUMENTS

| | | |
|---|---|---|
| EP | 0 637 537 A2 | 2/1995 |
| JP | 61-257368 A | 11/1986 |
| JP | 3-153471 A | 7/1991 |
| JP | 7-47963 A | 2/1995 |

* cited by examiner

Primary Examiner—Benjamin C. Lee
(74) Attorney, Agent, or Firm—Burns, Doane, Swecker & Mathis, LLP

(57) ABSTRACT

A rear wheel steering angle control apparatus is provided with a rear wheel steering angle determining unit and a rear wheel steering mechanism so as to determine a steering angle ratio based upon vehicle speed and perform a rear wheel steering angle control. An alerting unit alerts that the output of the rear wheel steering mechanism is beyond a predetermined allowable range when an observing unit detects a control condition being abnormal and releases the alert when the output of the rear wheel steering mechanism is within the predetermined allowable range.

9 Claims, 9 Drawing Sheets

REAR WHEEL STEERING ANGLE CONTROL APPARATUS

This application is based on and claims priority under 35 U.S.C. §119 with respect to Japanese Application No. 2001-093468 filed on Mar. 28, 2001, the entire content of which is incorporated herein by reference.

FIELD OF THE INVENTION

This invention generally relates to a vehicle steering system. More particularly, the present invention pertains to a rear wheel steering angle control apparatus for controlling a rear wheel steering angle relative to a front wheel steering angle.

BACKGROUND OF THE INVENTION

Figure 13:
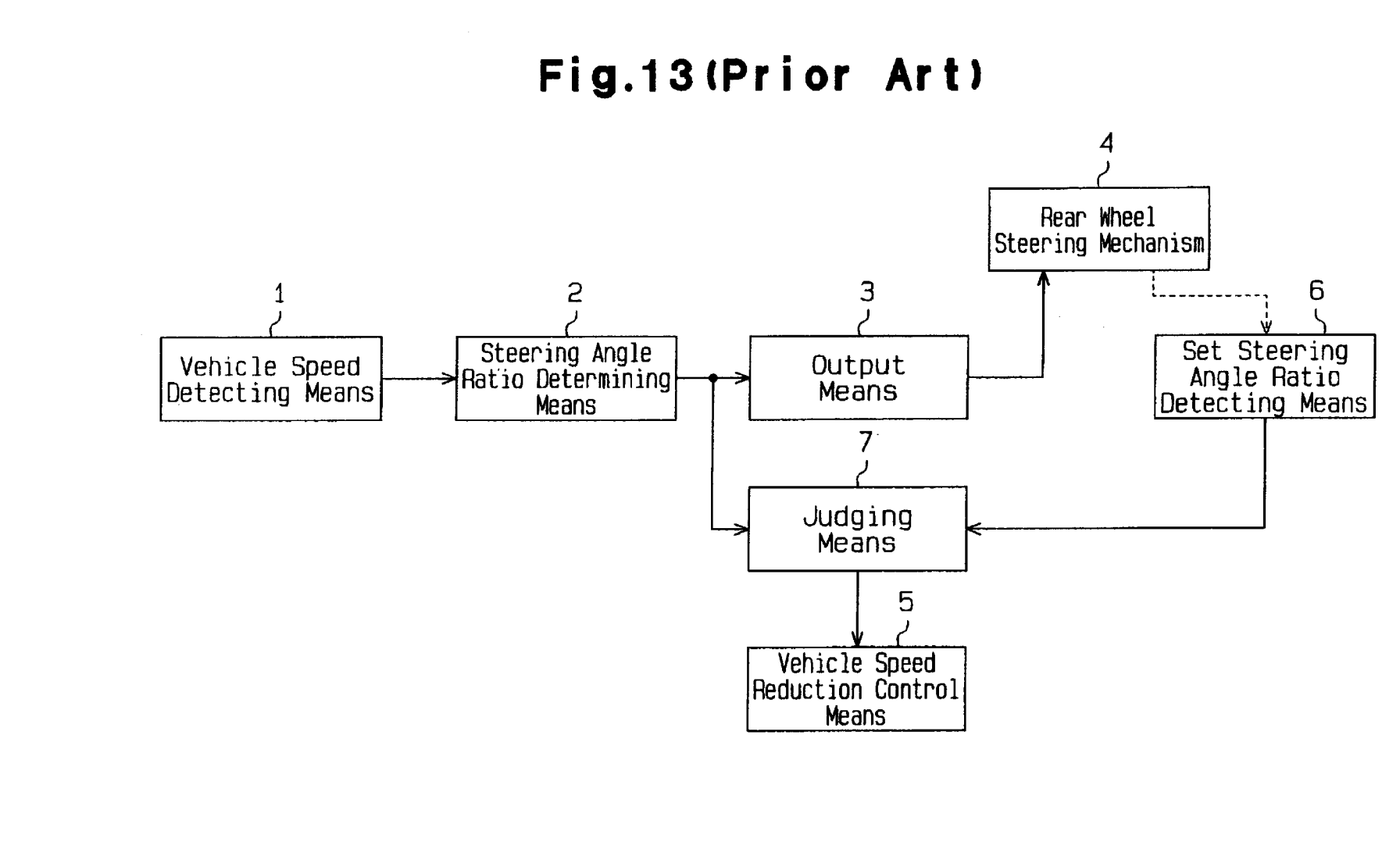
FIG. 13 is a block diagram schematically illustrating the overall functioning of a known rear wheel steering angle control apparatus.

An example of a rear wheel steering angle control apparatus is disclosed in Japanese Patent Laid-Open Publication No. 61(1986)-257368. Referring to FIG. 13, this known rear wheel steering angle control apparatus is provided with a vehicle speed detecting means 1 for detecting a vehicle speed, a steering angle ratio determining means 2, an output means 3, and a rear wheel steering mechanism 4. The steering angle ratio determining means 2 determines a steering angle ratio for controlling the rear wheels in an opposite direction relative to the front wheels (opposite-direction rear-steer) when the vehicle speed detected by the vehicle speed detecting means 1 is low and determines a steering angle ratio for controlling the rear wheels in the same direction relative to the front wheels (same-direction rear-steer) when the detected vehicle speed is high. The output means 3 outputs a control signal corresponding to the steering angle ratio determined by the steering angle ratio determining means 2. The rear wheel steering mechanism 4 sets a rear wheel steering angle to the determined steering angle ratio in response to the control signal.

The rear wheel steering angle control apparatus is further provided with a set steering angle ratio detecting means 6, a judging means 7, and a vehicle speed reduction control means 5. The set steering angle ratio detecting means 6 detects the steering angle ratio set by the rear wheel steering mechanism 4. The judgment means 7 judges whether or not the difference between the steering angle ratio determined by the steering angle ratio determining means 2 and the set steering angle ratio detected by the set steering angle ratio detecting means 6 is within a predetermined allowable range. When the difference is beyond the allowable range, the vehicle speed is reduced by the vehicle speed reduction control means 5. Therefore, an abnormal condition for setting the steering angle ratio caused due to a malfunction of the rear wheel steering mechanism 4 can be detected.

When the difference between the determined steering angle ratio and the set steering angle ratio detected by the detecting means 6 is greater than a predetermined value in a state where the abnormal condition resulting from a malfunction of the rear wheel steering mechanism 4 is detected, the vehicle speed reduction control means 5 reduces the vehicle speed.

Therefore, the vehicle can be prevented from running in unstable running directions when a vehicle driving stability is deteriorated by a malfunction of the rear wheel steering mechanism 4. Therefore, the safety performance for driving the vehicle can be improved.

However, assuming that the steering angle ratio determining means 2 malfunctions, the vehicle speed reduction control means 5 may reduce the vehicle speed, when it is not needed, in response to a wrong direction of the malfunctioning steering angle ratio determining means 2. On the other hand, the vehicle speed reduction control means 5 may not function to reduce the vehicle speed, when it is needed, due to the malfunction of the steering angle ratio determining means 2. That is, the vehicle speed control may not be performed properly. Also, when the set steering angle ratio detecting means 6 malfunctions, the same drawbacks may occur.

Further, when the rear wheel steering mechanism 4 without a neutral position return function malfunctions beyond the allowable range, the vehicle speed will be continuously reduced. Additionally, when the rear wheel steering mechanism 4 malfunctions, the vehicle speed is restrained. In such a case, the other controls associated with the vehicle speed may not be properly performed.

Another rear wheel steering angle control apparatus is disclosed in Japanese Patent Laid-Open Publication No. 3(1991)-153471. In this apparatus, the rear wheels are automatically returned to a neutral position when the rear wheel steering mechanism 4 malfunctions. In such a case, a driver may feel unexpected vehicle behavior. Although the driver is warned that the rear wheels are automatically returned to the neutral position in the case that the rear wheel steering mechanism 4 malfunctions, the other controls may not be properly performed. A further rear wheel steering angle control apparatus described in Japanese Patent Laid-Open Publication No. 7(1996)-47963 by the same applicant does not overcome these difficulties.

Additionally, in the rear wheel steering angle control apparatus disclosed in Japanese Patent Laid-Open Publication No. 3(1991)-153471, a warning lamp and a neutral position biasing means are controlled by a single driving force interrupting means signal. Therefore, the vehicle may be in a 2WS (two-wheel-steering) state when the vehicle is initially started.

Accordingly, the above disclosed rear wheel steering angle control apparatus are still susceptible of certain improvements with respect to performing a normal vehicle running without drastically varying the vehicle running speed when a system of rear wheel steering angle control signals is detected to be abnormal.

SUMMARY OF THE INVENTION

A rear wheel steering angle control apparatus includes a rear wheel steering angle determining unit, a rear wheel steering mechanism, an observing unit, a neutral position detecting unit, and an alerting determining unit. The rear wheel steering angle determining unit determines a steering angle ratio based upon a vehicle speed while the rear wheel steering mechanism outputs a control signal corresponding to the steering angle ratio and sets a rear wheel steering angle corresponding to the control signal. The observing unit detects an abnormal condition of inputting and calculating processes of the rear wheel steering angle determining unit and an abnormal condition of an output signal supplied to the rear wheel steering mechanism. The neutral position detecting unit detects whether or not the output of the rear wheel steering mechanism is within a predetermined allowable range including a neutral position. The alerting determining unit provides an alert that the output of the rear wheel steering mechanism is not within the predetermined allowable range when the observing unit detects the abnormal condition and releases the alert when the output of the rear wheel steering mechanism is within the predetermined allowable range.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
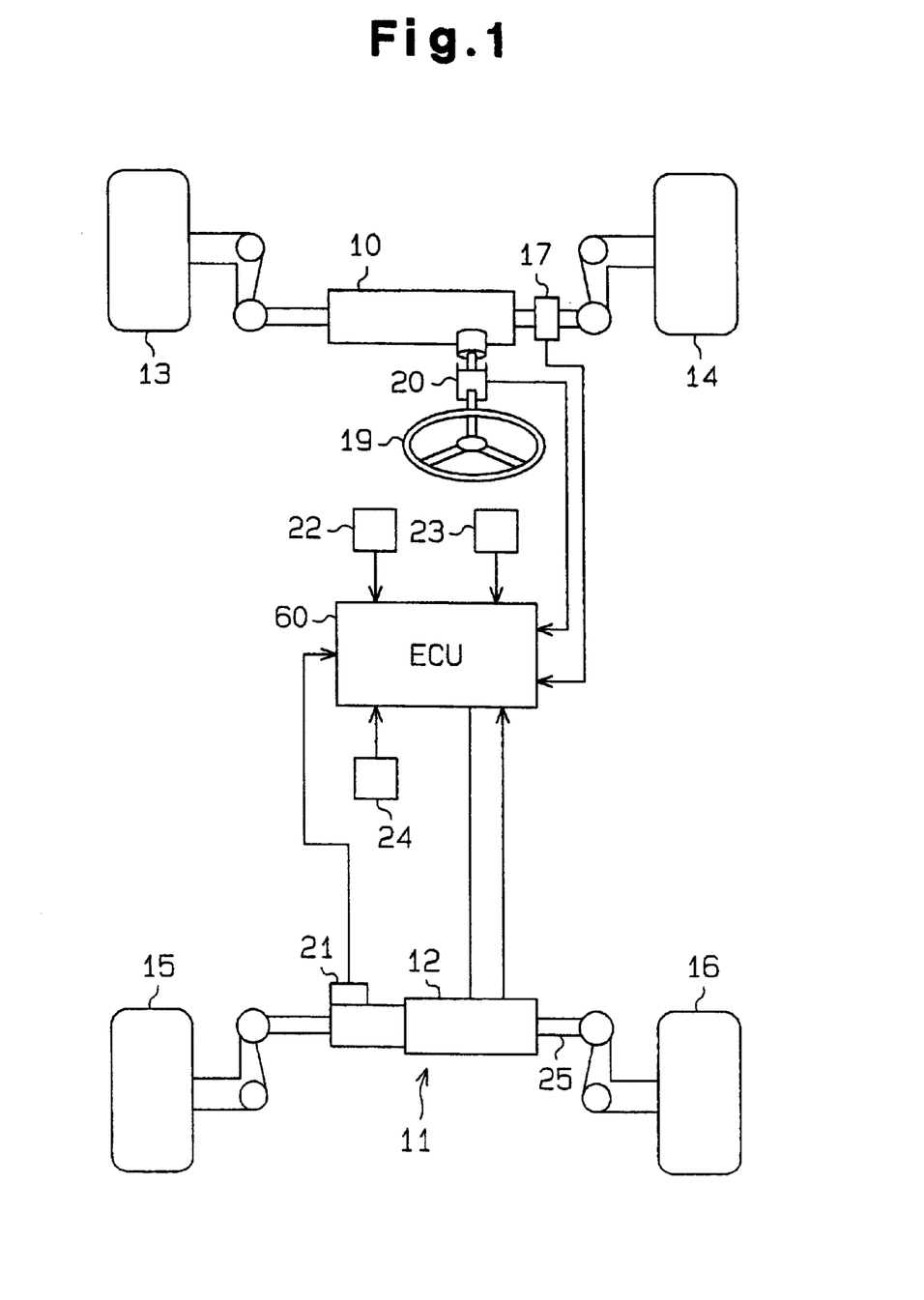
FIG. 1 is a schematic illustration of the overall structure associated with a rear wheel steering angle control apparatus according to a first embodiment of the present invention.

Referring to FIG. 1, a vehicle is provided with front wheels 13, 14 that are steered by a front wheel steering mechanism 10 in response to the turning operation of a steering wheel 19. The steering angle of each front wheel 13, 14 is detected by a first front wheel steering angle sensor 17 which detects the displacement or moving amount of a rack (an operational shaft for front-wheel steering) of the front wheel steering mechanism 10 and by a second front wheel steering angle sensor 20 mounted on the steering column fixed to the steering wheel 19. The first front wheel steering angle sensor 17 employs a linear sensor, for example a potentiometer. The second front wheel steering angle sensor 20 employs a sensor, for example a rotary encoder, for generating a pulse(s) in response to a rotational movement of the steering wheel 19 (i.e., the steering column).

The rear wheels 15, 16 are steered by a rear wheel steering mechanism 11 actuated by the driving power of a motor 12 employing a brushless motor. One end of the motor 12 is provided with a magnetic pole sensor 18 (shown in FIG. 2) for detecting the rotational angle of the motor 12. A rear wheel steering angle sensor 21 is fixed to an operational shaft 25 for rear-wheel steering and detects an actual steering angle of the rear wheels 15, 16. A cam mechanism is disposed at a shaft of the rear wheel steering angle sensor 21. A neutral position detecting sensor 68 (shown in FIG. 2) detects whether or not the rear wheel steering mechanism 11 is at a neutral position by way of a switch that is opened and closed by the cam mechanism. The output from the neutral position detecting sensor 68 can be set within a predetermined allowable range including the neutral position in accordance with a cam profile.

The vehicle is further provided with a first vehicle speed sensor 22 and a second vehicle speed sensor 23 for detecting the vehicle speed, and a yaw rate sensor 24 for determining the vehicle yaw rate.

Figure 7:
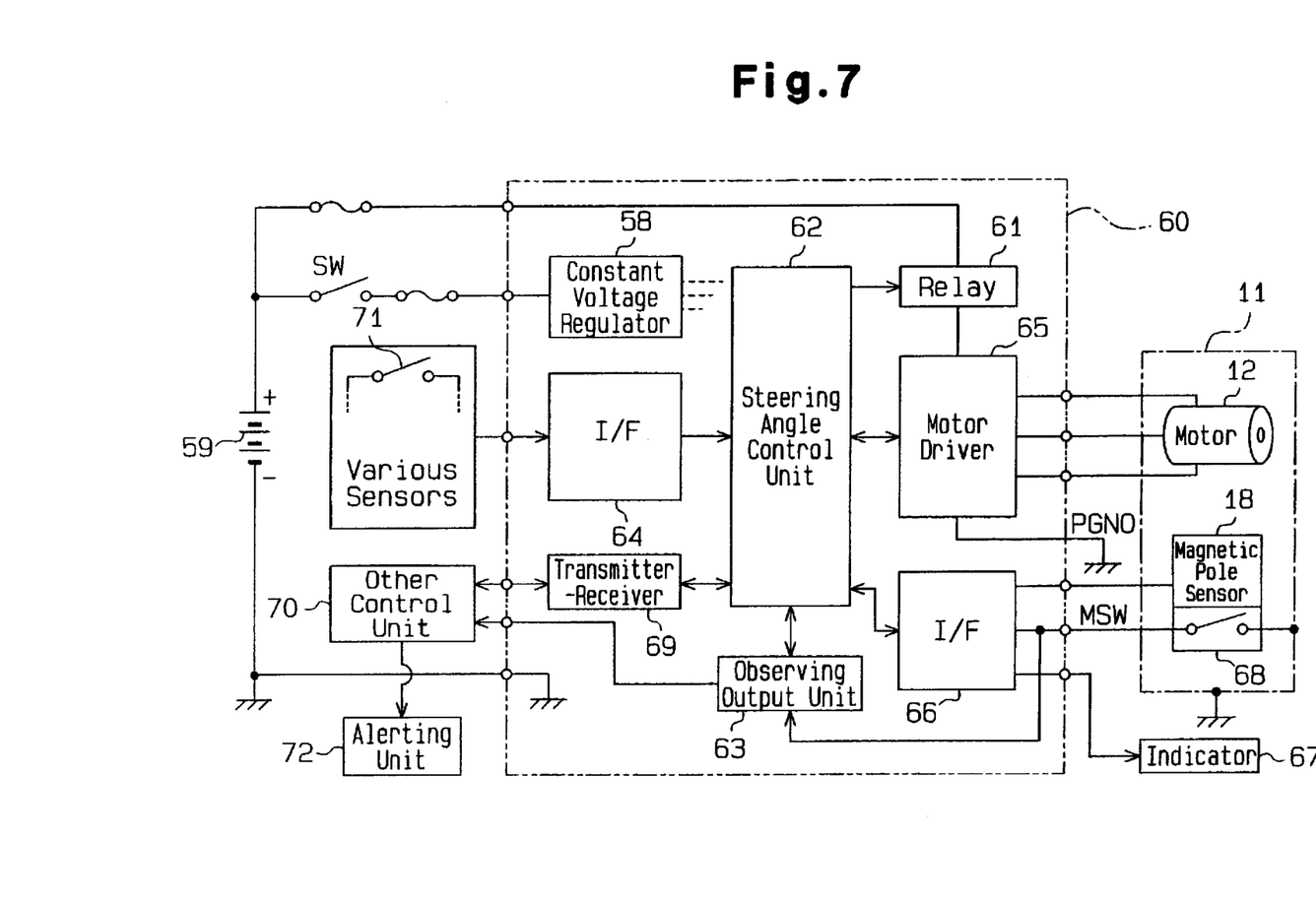
FIG. 7 is a block diagram schematically illustrating the overall control system used in the rear wheel steering angle control apparatus shown in FIG. 1.

Referring to FIG. 7, the motor 12 is controlled in response to a signal from an electronic control unit (ECU) 60. Each output from the first front wheel steering angle sensor 17, the second front wheel steering angle sensor 20, the rear wheel steering angle sensor 21, the first vehicle speed sensor 22, the second vehicle speed sensor 23, and the yaw rate sensor 24 is inputted to the ECU 60 via an interface 64. The ECU 60 then calculates a required rear wheel steering angle corresponding to a front wheel steering angle and a vehicle driving condition and drives or operates the motor 12 to achieve the required rear wheel steering angle. Each output from the magnetic pole sensor 18 and from the neutral position detecting sensor 68 is inputted to the ECU 60 via an interface 66. The ECU 60, then calculates a required rear wheel steering angle output and judges whether or not the position of the rear wheel steering mechanism 11 is within a predetermined allowable range. It is to be understood that the output from the neutral position detecting sensor 68 can be directly inputted to other control units not via the ECU 60. The interface 64 is operatively connected to a select switch 71 for selectively performing the rear wheel steering angle control. A signal from the select switch 71 is inputted to the ECU 60. The output from the ECU 60 is transmitted to an indicator 67 via the interface 66.

Figure 2:
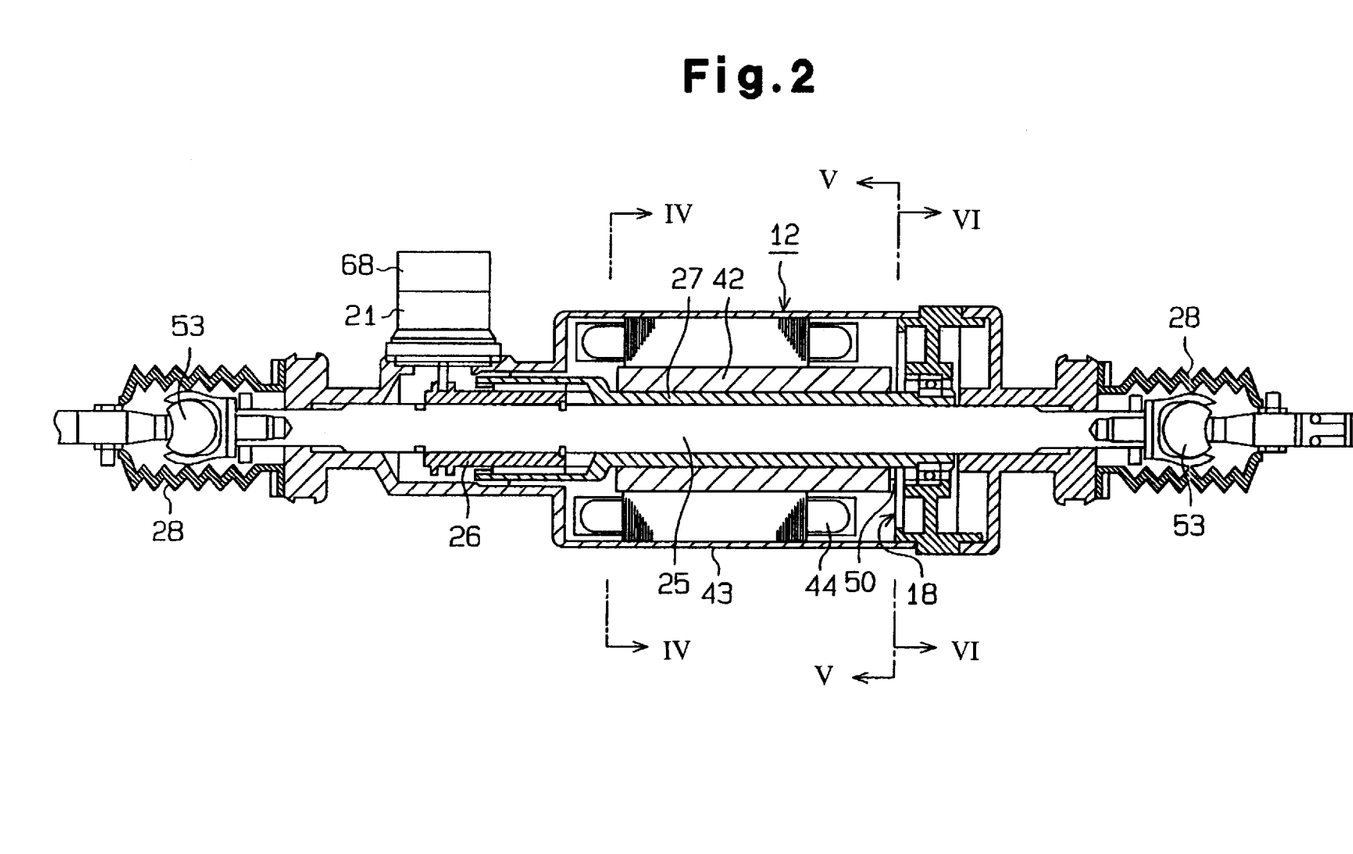
FIG. 2 is a vertical cross-sectional view of a mechanism forming a part of the rear wheel steering angle control apparatus according to the first embodiment.
Figure 3:
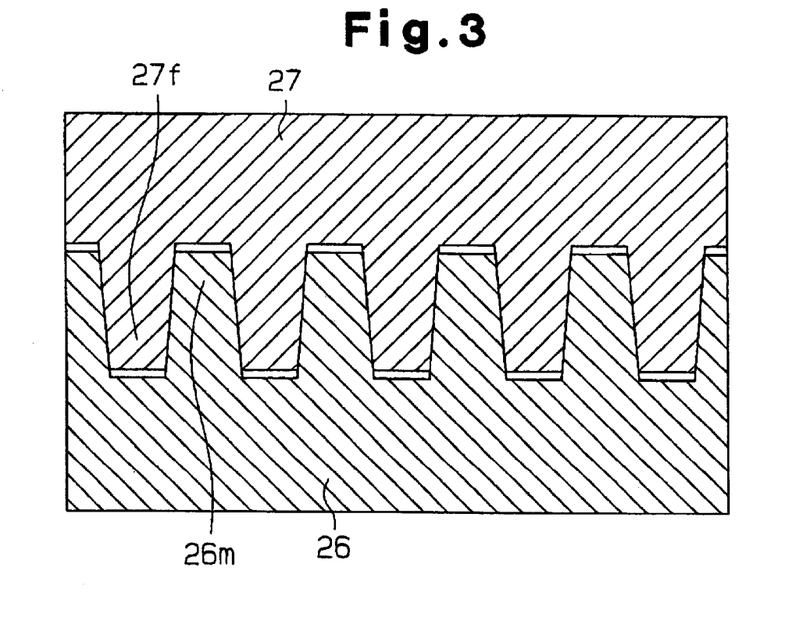
FIG. 3 is an enlarged vertical cross-sectional view of the engagement portion of the mechanism illustrated in FIG. 2.

Referring to FIG. 2, both end portions of the operational shaft 25 disposed at right angles relative to a vehicle longitudinal direction are operatively connected to knuckle arms via ball joints 53 and are protected by boots 28. The operational shaft 25 extends in a hollow rotational shaft 27 of the motor 12. The operational shaft 25 is fixed to a male screw member 26 of an approximately cylindrical structure. As illustrated in FIG. 3, trapezoidal female screws or screw threads 27f are provided on the inner surface of a large diameter portion of the hollow rotational shaft 27. On the other hand, trapezoidal male screws or screw threads 26m are provided on the outer surface of a large diameter portion of the male screw member 26. The trapezoidal female screw threads 27f are engaged with the trapezoidal male screw threads 26m.

The engagement between the female screw threads 27f and the male screw threads 26m establishes a reverse efficiency to be set at zero so as not to be varied due to a force from the road surface. Therefore, the hollow rotational shaft 27 is not rotated by an external force applied to the operational shaft 25 even when the external force is applied to the operational shaft 25 to be moved.

An arm member extending in the radial direction is engaged with the male screw member 26 at the tip end of the arm member and is fixed to the rotational shaft of the rear wheel steering angle sensor 21 at the other end thereof.

When the operational shaft 25 is moved in a reciprocating manner in an extending direction of its axial extent, the rotational shaft of the rear wheel steering angle sensor 21 is rotated in the normal and reverse directions. Therefore, the signal outputted from the rear wheel steering angle sensor 21 corresponds to the position of the operational shaft 26 (i.e., the rear wheel steering angle).

Figure 4:
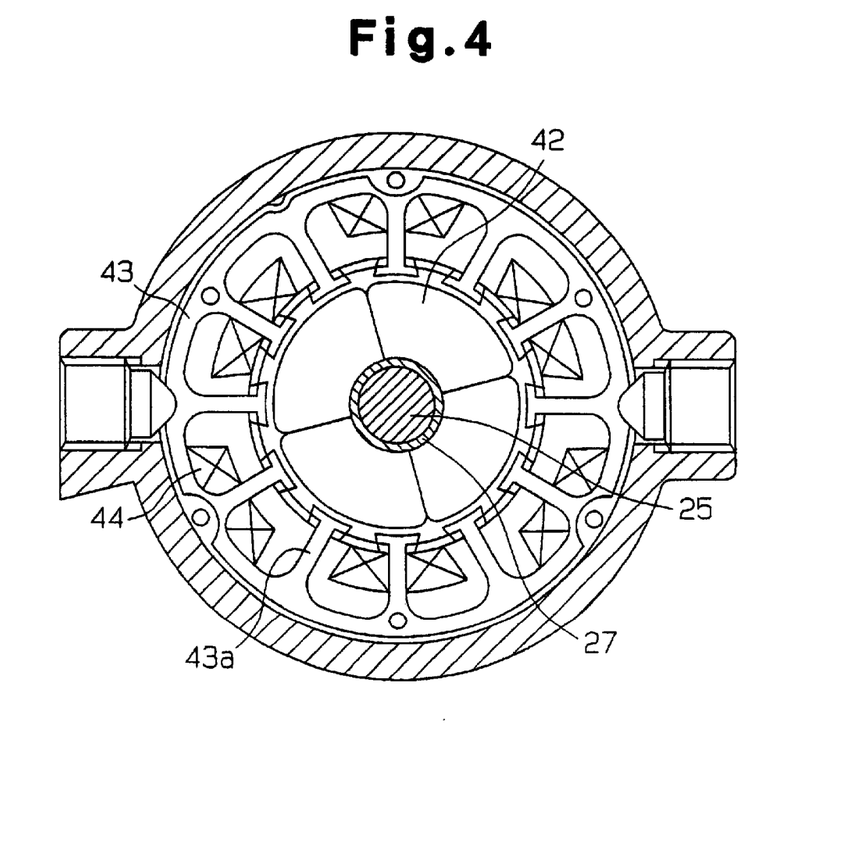
FIG. 4 is an enlarged cross-sectional view taken along the section line IV—IV of FIG. 2.
Figure 5:
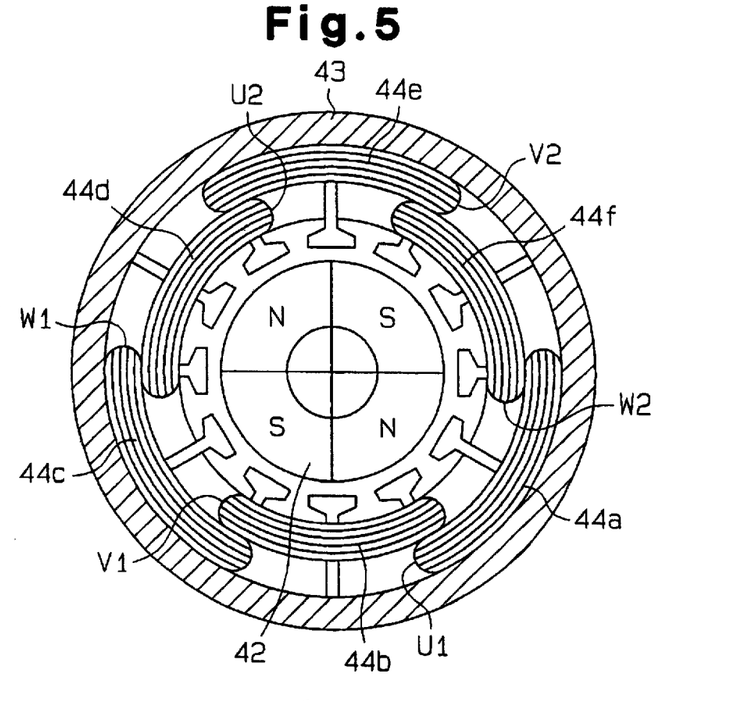
FIG. 5 is an enlarged cross-sectional view taken along the section line V—V of FIG. 2 illustrating details of the electric coil of the motor.

Referring to FIGS. 4 and 5, the hollow rotational shaft 27 of the motor 12 is provided with a cylindrically shaped magnet 42 including four poles. An approximately cylindrically shaped magnetic yoke 43 surrounds the outer circumferential surface of the magnet 42. Twelve magnetic poles 43a project towards the magnet 42 from the yoke 43. An electric coil 44 is rolled or wound around the twelve magnetic poles 43a by thee magnetic poles as one magnetic pole group so as to establish six phases. The six phases are divided into two systems. The first system includes a first electric coil 44a, a second electric coil 44b, a third electric coil 44c and the second system includes a fourth electric coil 44d, a fifth electric coil 44e, and a sixth electric coil 44f. One end of each electric coil 44a, 44b, 44c, 44d, 44e, 44f is outputted from each terminal U1, V1, W1, U2, V2, W2. The other end of each electric coil 44a, 44b, 44c is electrically connected thereto and the other end of each electric coil 44d, 44e, 44f is electrically connected thereto. Therefore, when the first system of electric coils 44 malfunctions, the motor 12 can be actuated by the second system of electric coils 44. Further, when the first and second sets function, the power of the motor 12 can be increased. Each of the first and second systems is connected to a motor driver 65 via each terminal and wire harness.

Figure 6:
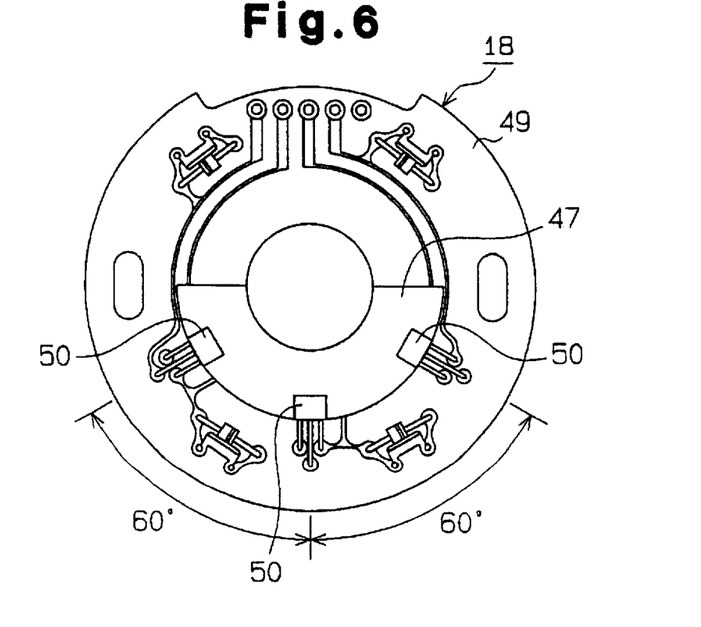
FIG. 6 is an enlarged cross-sectional view taken along the section line VI—VI of FIG. 2 in which three hole ICs are illustrated.

Referring to FIG. 6, the magnetic pole sensor 18 is provided with three hole ICs 50. The hole ICs 50 are arranged at 60 degree intervals as shown in FIG. 6. Outputs from the three hole ICs 50 are employed as magnetic pole signals HA, HB, HC by the ECU 60. When the hollow rotational shaft 27 of the motor 12 is rotated, the magnet 42 is rotated relative to the three hole ICs 50. Therefore, the magnetic pole signals HA, HB, HC are varied between a high level and a low level. When the motor 12 is rotated in a counterclockwise direction, for example, the magnetic signals HA, HB, HC of the magnetic pole sensor 18 are switched, respectively. Electric current applied to each electric coil is switched substantially at a time with the switching operation of the magnetic pole signals HA, HB, HC so that the magnet 42 (i.e., a rotor) is rotated.

According to this first embodiment, the motor 12 is divided into a motor M1 and a motor M2 upon a control operation. Therefore, the motor driver 65 is divided into two systems as well. Therefore, even if one of the motors M1 or M2 malfunctions or one of the two systems of the motor driver 65 malfunctions, the rear wheels 13, 14 can be returned to the neutral position by driving the other motor or the other system of the motor driver 65. For example, when an abnormal electric current is detected in the motor driver 65 of the motor M1 under the motor M1 experiencing a malfunction, the electric current applied to the motor M1 is interrupted. Therefore, the steered rear wheels 13, 14 can be returned to the neutral position by driving the motor M2. On the other hand, when the motor M2 is judged to be malfunctioning, the electric current applied to the motor M2 is interrupted. Therefore, the steered rear wheels 13, 14 can be returned to the neutral position by driving the motor M1. Although the output of the motor 12 will be decreased since either the motor M1 or the motor M2 is driven, the rear wheels 13, 14 can be effectively returned to the neutral position without providing a clutch, a return spring or other necessary structure.

Figure 12:
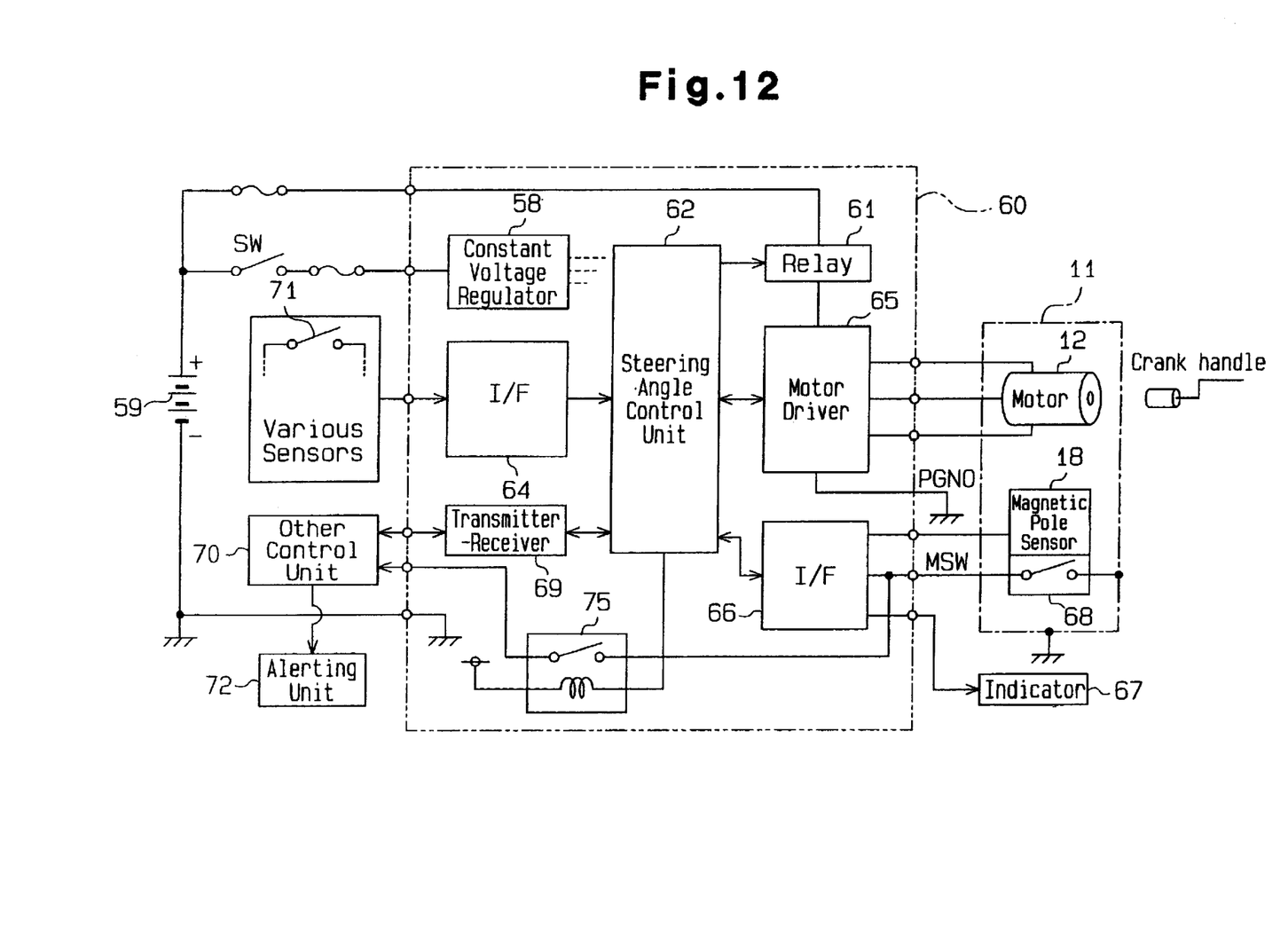
FIG. 12 is a block diagram schematically illustrating the overall control system of a rear wheel steering angle control apparatus according to a second embodiment.

A clutch can be provided for the rear wheel steering system so as to return the rear wheels 13, 14 to the neutral position. Alternatively, the rear wheels 13, 14 can be manually returned to the neutral position by rotating the rotational shaft 27 of the motor 12 by way of a handle (e.g., a crank handle as shown in FIG. 12).

Referring to FIG. 7, the ECU 60 is connected to a battery 59 mounted on the vehicle. The battery 59 is operatively connected to a constant voltage regulator 58 via a fuse and an ignition switch SW for supplying the constant voltage to each unit of the ECU 60.

The ECU 60 is further provided with a steering angle control unit 62 employing a microprocessor for performing a main control and an observing output unit 63 including an electronic circuit for observing abnormal conditions and for performing output control. The steering angle control unit 62 receives signals from the first front wheel steering angle sensor 17, the second front wheel steering angle sensor 20, the first vehicle speed sensor 22, the second vehicle speed sensor 23 and the yaw rate sensor 24 via the interface 64, and also receives signals from the magnetic pole sensor 18 and the neutral position detecting sensor 68 via the interface 66. The steering control unit 62 the performs the rear wheel steering angle control based upon the outputs from the first front wheel steering angle sensor 17, the second front wheel steering angle sensor 20, the first vehicle speed sensor 22, the second vehicle speed sensor 23, the yaw rate sensor 24, the rear wheel steering angle sensor 21, and the three outputs HA, HB, HC of the magnetic pole sensor 18.

The signal from the select switch 71 for selectively performing the rear wheel steering angle control is inputted to the steering angle control unit 62 via the interface 64. The rear wheel steering angle is changed by the steering angle control unit 62 to set the rear wheel steering mechanism 11 at the neutral position by the operation of the select switch 71 when the abnormal condition is detected by the observing output unit 63. A transmitter-receiver 69 is employed for transmitting and receiving signals between the steering angle control unit 62 and the other control unit 70 for performing other controls including an engine control. An alerting unit 72 visually or auditorily alerts the driver of the malfunction or the abnormal condition and outputs a diagnosis via the other control unit 70.

Figure 8:
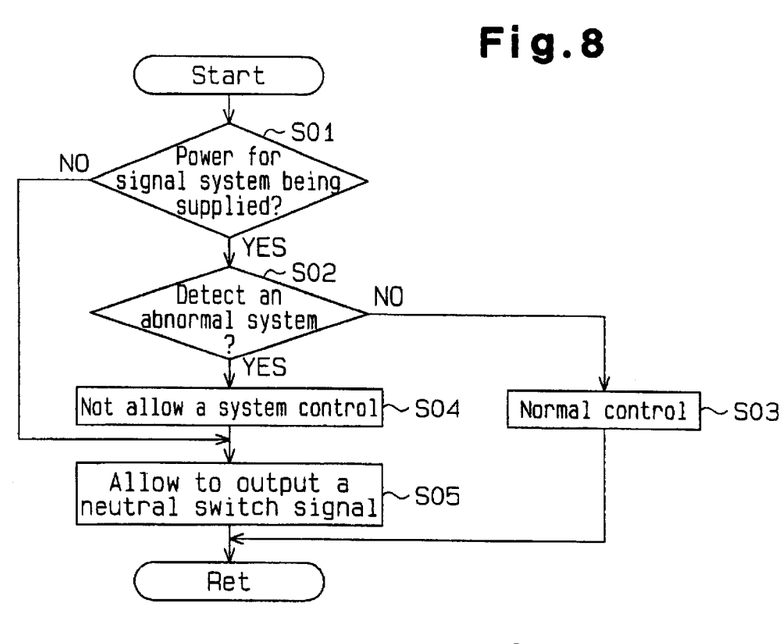
FIG. 8 is a flow chart showing a main program performed by an observing output unit for observing and controlling an output therefrom.

Referring to FIG. 8, the main program of the rear wheel steering angle control is carried out as follows. The main program is performed by the observing output unit 63 and the steering angle control unit 62. When power for signal system is not supplied at step S01, the program proceeds to step S05 to allow the output of a neutral switch signal. That is, the neutral position detecting sensor 68 is allowed to output the signal to the other control unit 70. On the other hand, when it is determined at step S01 that power for the signal system is supplied, the program proceeds to step S02 to detect whether or not the system is abnormal by observing an inputting process by the steering control unit 62, a calculating process thereby, and an output signal transmitted to the rear wheel steering mechanism 11. When the system is detected to not be abnormal at step S02, the program proceeds to step S03 to perform normal control.

At step S03, the hollow rotational shaft 27 of the motor 12 is rotated by the steering angle control unit 62 in response to the motor 12 electrically excited by the motor driver 65. The female screw thread 27f integrally formed with the hollow rotational shaft 27 is integrally rotated with the hollow rotational shaft 27. Therefore, the male screw thread 26m by virtue of being engaged with the female screw thread 27f are moved in the direction of extent of the hollow rotational shaft 27 in response to the rotation of the female screw 27f. The operational shaft 25 integrally formed with the male screw 26m is hence moved in the same direction. The ends of the operational shaft 25 are operatively connected to the left and right wheels in a known manner. Therefore, the wheels 15, 16 are steered by the displacement of the operational shaft 25.

On the other hand, when the system is judged to be abnormal at step S02, the program proceeds to step S04 to not allow the motor driver 65 to drive the motor 12. The program then proceeds to step S05 to allow the neutral position detecting sensor 68 to output the signal to the other control unit 70.

Figure 9:
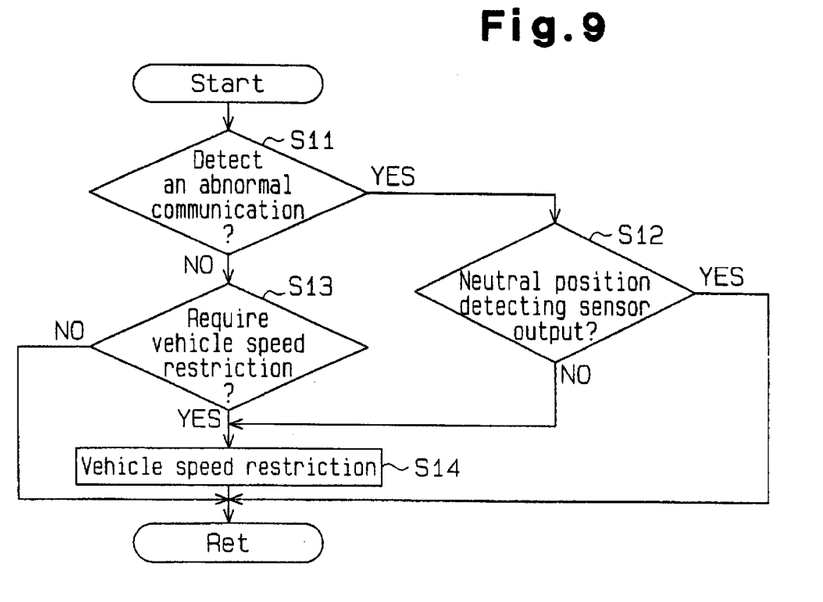
FIG. 9 is a flow chart showing a program for implementing a vehicle speed restriction.

Referring to FIG. 9, the vehicle speed restriction according to this first embodiment is performed under a condition that the engine is controlled by the other control unit 70. When a communication signal from the transmitter-receiver 69 is judged to be normal at step S11, the program proceeds to step S13 to judge whether or not a signal requiring vehicle speed restriction is outputted from the steering angle control unit 62 via the transmitter-receiver 69. When the vehicle speed restriction is not required, this program is terminated. On the other hand, when it is determined at step S13 that the vehicle speed restriction is required, the program proceeds to step S14 to restrain the vehicle speed.

When the communication signal from the transmitter-receiver 69 is judged to be abnormal at step S11, the program is followed by step S12. The neutral position detecting sensor 68 has already been allowed to output the signal to the other control unit 70 at step S05. Therefore, the signal outputted from the neutral position detecting sensor 68 is directly judged at step S12. When the outputted signal represents that the rear wheel steering mechanism 11 is within the predetermined range including the neutral position, the vehicle speed is not required to be restrained. The program is thus terminated. However, when the outputted signal does not indicate that the rear wheel steering mechanism 11 is within the predetermined range, the program proceeds to step S14 to restrain the vehicle speed.

Figure 10:
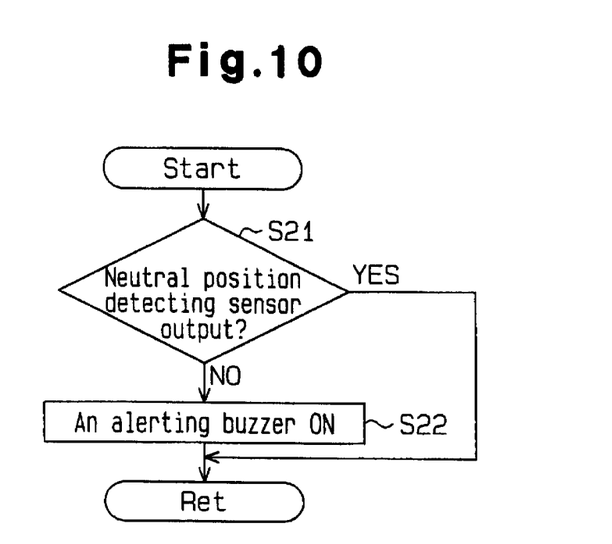
FIG. 10 is a flow chart showing a program for alerting a driver.

Referring to FIG. 10, when the outputted signal of the neutral position detecting sensor 68 is detected to be within the predetermined range including the neutral position at step S21 while the vehicle speed is being restrained, the program is terminated. On the other hand, when the output from the neutral position detecting sensor 68 is not detected to be within the predetermined range at the step S21, the abnormal condition has occurred when the vehicle speed restriction has been required. The program then proceeds to step S22 to alert the driver of the abnormal condition visually and/or in an auditory manner by the alerting unit 72. That is, the driver is notified by the displayed abnormal condition or by a buzzer sound for the abnormal condition. Therefore, the rear wheels 15, 16 can be returned to the neutral position manually when driver is alerted to the abnormal condition as described above. That is, the rear wheels 15, 16 can be manually returned to the neutral position when a rotational biasing system is abnormal. The rear wheels 15, 16 are thus prevented from being maintained under the steered condition. Especially when the rear wheels 15, 16 are manually returned to the neutral position, the output from the neutral position detecting sensor 68 is detected to be within the predetermined range at steps S12 and S21, and the vehicle speed restriction is automatically released.

The operational shaft 25 extends in the hollow rotational shaft 27 of the motor 12 so that the size of the operational shaft 25 in a direction perpendicular to the extending direction of the operational shaft 25 can be reduced as much as possible. The output torque reduced by the structure can be compensated for by elongating the motor 12 in the extending direction of the rotational shaft 25. The steering apparatus can have a small diameter with the operational shaft 25 at a central portion thereof. The rear wheel steering control is performed by the relative movement of the female screws 27f and the male screws 26m in the extending direction thereof in response to the relative rotation thereof. Both the female screws 27f and the male screws 26m are not rotated even when a relative force is applied in the axial direction between the female screw threads 27f and the male screw threads 26m. Further, both of them are not moved in the axial direction when any one of them is fixed in the axial direction.

Therefore, the load on the motor 12 is not increased when the operational shaft 25 is applied with a force from a vehicle wheel to move the operational shaft 25 in the extending direction. Therefore, a required torque for a steering control can be relatively small. Further, the engagement of the female screws 27f and the male screws 26m can prevent the rotational shaft 25 from being moved by the force applied thereto from the vehicle wheel when the motor 12 is not electrically excited.

A rear wheel steering control apparatus according to a second embodiment is illustrated in FIG. 12. This second embodiment differs from the first embodiment in that a relay 75 is substituted for the observing output unit 63. For example, when the rear wheels 15, 16 cannot be returned to the neutral position due to a failure of the electric current supply and/or an abnormality in the microprocessor, the signal from the neutral position detecting sensor 68 can be directly transmitted to the other control unit 70 by turning ON the relay 75. The neutral position detecting sensor 68 is turned OFF when the rear wheel steering angle is set to be small within a predetermined range, and is turned ON and connected to a ground (GND) when the rear wheel steering angle is set to be relatively large.

In both the first and second embodiments, the output of the neutral position detecting sensor 68 can be directly outputted to the other control unit 70 not via the observing output unit 63 or the relay 75. Therefore, the above description regarding the second embodiment shows that the steering angle control unit 62 can be structured integrally with the observing output unit 63.

More specifically, the relay 75 is turned OFF by the steering control unit 62 in a normal condition and is turned ON when the electric current is not supplied. Further, the steering angle control unit 62 is provided with, a self-diagnosis function. When the signal from the neutral position detecting sensor 68 is at a ground (GND) level, the other control unit 70 functions for restraining the vehicle speed. However, when the communication between the ECU 60 and the other control unit 70 has been normally implemented, the vehicle speed restriction is not performed. When the rear wheel steering mechanism 11 is manually returned to the neutral position, the vehicle speed restriction is released. The driver can be notified that the rear wheels were manually returned to the neutral position by separating the alert for the malfunction requiring the rear wheels to be returned to the neutral position and the alert for manually returning the rear wheels to the neutral position.

When the rear wheel steering angle is relatively large, the vehicle can be driven in a stable manner with a good running performance by employing required processes for performing the vehicle speed restriction and a vehicle stability control. On the other hand, when the rear wheel steering angle is relatively small, the condition of the rear wheel steering angle can be alerted to the driver.

Figure 11:
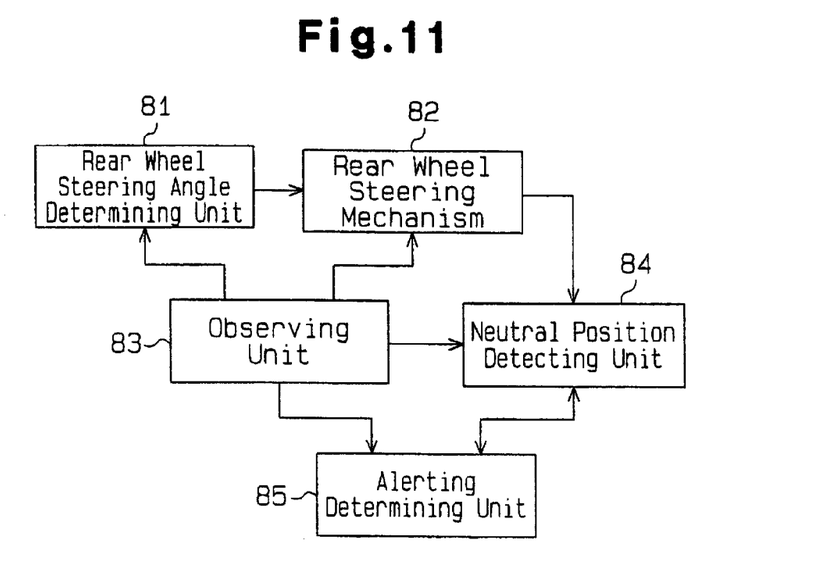
FIG. 11 is a block diagram schematically illustrating the overall functioning of the rear wheel steering angle control apparatus.

As illustrated in FIG. 11, the rear wheel steering angle control apparatus according to the first and second embodiments is provided with a rear wheel steering angle determining unit 81, a rear wheel steering mechanism 82, an observing unit 83, a neutral position detecting unit 84 and an alerting determining unit 85. The rear wheel steering angle determining unit 81 provided with the steering angle control unit 62 for determining the steering angle ratio based upon the vehicle speed detected by the first vehicle speed sensor 22 and the second vehicle speed sensor 23. The rear wheel steering mechanism 82 is provided with the rear wheel steering mechanisms 11 for outputting a control signal corresponding to the steering angle ratio determined by the rear wheel steering angle determining unit 81 and for setting the rear wheel steering angle in response to the control signal. The observing unit 83 functions at or carries out steps S01–S05 for detecting an abnormal condition of each inputting and calculating process by the rear wheel steering angle determining unit 81 and for detecting an abnormal condition of a signal applied to the rear wheel steering mechanism 82. The neutral position detecting unit 84 is provided with the neutral position detecting sensor 68 for detecting whether or not the output of the rear wheel steering mechanism 82 (i.e., the rear wheel steering angle set by the rear wheel steering mechanism 82) is within the predetermined allowable range including the neutral position. The alerting determining unit 85 provides an alert that the output of the rear wheel steering mechanism 82 is not within the predetermined allowable range when the observing unit 83 detects the abnormal condition. Further, the alerting determining unit 85 functions at or carries out steps S11–S14 and steps S21, S22 to release the vehicle speed restriction when the output of the rear wheel steering mechanism 82 provided with the rear wheel steering mechanism 11 is within the predetermined allowable range.

The rear wheel steering angle determining unit 81 and the rear wheel steering mechanism 82 determines the steering angle ratio based upon the detected vehicle speed when the system is under the normal condition. For example, the steering angle ratio is determined for controlling the rear wheels in an opposite direction relative to the front wheels (opposite-direction rear-steer) when the detected vehicle speed is low. The steering angle ratio is determined for controlling the rear wheels in the same direction relative to the front wheels (same-direction rear-steer) when the detected vehicle speed is high. The observing unit 83 detects the abnormal condition of each inputting and calculating process by the rear wheel steering angle determining unit 81 and the abnormal condition of the signal transmitted to the rear wheel-steering mechanism 82. When the output of the rear wheel steering mechanism 82 is not within the predetermined allowable range in a state where the observing unit 83 detects the abnormal condition, the abnormal condition is alerted to the driver visually and/or in an auditory manner. On the other hand, when the output of the rear wheel steering mechanism 82 is within the predetermined allowable range, the driver is not alerted.

The driver and/or the other control units are alerted by the output of the neutral position detecting unit 84 whether or not the output from the rear wheel steering mechanism 82 is within the predetermined allowable range. The driver and/or the other control units can thus deal with an assumption that the rear wheel steering angle determining unit 81 and the rear wheel steering mechanism 82 are abnormal. Therefore, the vehicle condition including the vehicle speed is not drastically changed due to the abnormal condition of the rear wheel steering angle control signal system so that the vehicle can be driven under the stable condition. More particularly, the alerting signal to the driver and/or the other control units are released in both cases that the output of the neutral position detecting unit 84 is automatically and manually controlled so as to set the output of the rear wheel steering mechanism 82 under the predetermined allowable range. Therefore, the normal driving of the vehicle can be performed.

The rear wheel steering mechanism 82 is not returned to the neutral position under the assistance of an elastic force of a spring and is not moved by the force applied to the rear wheel is 15, 16 from the road surface. Therefore, the output of the rear wheel steering mechanism 82 is not changed even when an energy supply to the rear wheel steering mechanism 82 is changed against the driver's intention.

The alerting determining unit 85 providing the alert allows the output of the rear wheel steering mechanism 82 to be manually returned to the predetermined allowable range when the output of the rear wheel steering mechanism 82 is beyond the predetermined allowable range in a state where the observing unit 83 detects the abnormal condition. Therefore, the driver does not feel any unexpected vehicle behavior.

According to the first and second embodiments, the rear wheel steering angle determining unit 81 is provided with the steering angle control unit 62. However, the rear wheel steering angle determining unit 81 is not limited to the above described structure as long as the rear wheel steering determining unit 81 includes a function for determining the steering angle ratio controlled in response to the detected vehicle speed.

In the first and second embodiments, the rear wheel steering mechanism 82 is provided with the rear wheel steering mechanism 11 including the motor 12 having the motor M1 and the motor M2, the operational shaft 25 for performing the rear wheel steering, the approximately cylindrical male screw member 26 fixed to the operational shaft 25, and the hollow rotational shaft 27 engaged with the male screw member 26. However, the rear wheel steering mechanism 82 is not limited to the above described structure as long as the rear wheel steering mechanism 82 includes a function for outputting the control signal corresponding to the steering angle ratio determined by the rear wheel steering angle determining unit 81 and for setting the rear wheel steering angle in response to the control signal.

In addition, according to the first and second embodiments, the observing unit 83 is provided with the observing output unit 63. However, the observing unit 83 is not limited to the above described structure as far as the observing unit 83 includes a function for detecting the abnormal condition of the inputting and calculating processes by the rear wheel steering angle determining unit 81 and/or for detecting the abnormal condition of the output signal supplied to the rear wheel steering mechanism 82. For example, the observing unit 83 can be employed for detecting the abnormal condition of the output signal supplied to the rear wheel steering mechanism 82 from the steering angle control unit 62 including the microprocessor. In more detail, the observing unit 83 can be employed for detecting the abnormal condition of the inputting process, the outputting process, and the microprocessor. The observing unit 83 is generally employed for detecting the steering angle ratio set by the rear wheel steering mechanism 11 and for judging whether or not the difference between the steering angle ratio outputted by the rear wheel steering angle determining unit 81 and the detected steering angle ratio is within a predetermined allowable range.

Further, according to the first and second embodiments of the present invention, the neutral position detecting unit 84 is provided with the neutral position detecting sensor 68. However, the neutral position detecting unit 84 is not necessarily limited to the above described structure as long as the neutral position detecting unit 84 functions for detecting that the output of the rear wheel steering mechanism 82 is beyond the predetermined allowable range.

In the embodiments described above, the alerting determining unit 85 provides an alert that the output of the rear wheel steering mechanism 82 is not within the predetermined allowable range when the observing unit 83 detects the abnormal condition. The alerting determining unit 85 releases the vehicle speed restriction from being required when the output of the rear wheel steering mechanism 82 is within the predetermined allowable range. As described above, the vehicle speed restriction is performed or released through the routine at steps S11–S14 and at steps S21, S22. However, the alerting determining unit 85 is not necessarily limited to the above described structure as long as the alerting determining unit 85 functions for alerting that the output for the rear wheel steering mechanism 82 is not within the predetermined allowable range when the observing unit 83 detects the abnormal condition and for releasing the alert when the output of the rear wheel steering mechanism 82 is within the predetermined allowable range.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A rear wheel steering angle control apparatus comprising:

a rear wheel steering angle determining unit which determines a steering angle ratio based upon vehicle speed;

a rear wheel steering mechanism which outputs a control signal corresponding to the steering angle ratio and sets a rear wheel steering angle corresponding to the control signal;

an observing unit which detects an abnormal condition of inputting and calculating processes of the rear wheel steering angle determining unit and an abnormal condition of an output signal supplied to the rear wheel steering mechanism;

a neutral position detecting unit which detects whether or not output of the rear wheel steering mechanism is within a predetermined allowable range including a neutral position; and an alerting determining unit which provides an alert that the output of the rear wheel steering mechanism is not within the predetermined allowable range when the observing unit detects at least one of the abnormal conditions and which does not provide the alert when the output of the rear wheel steering mechanism is within the predetermined allowable range.

2. The rear wheel steering angle control apparatus according to claim 1, wherein the rear wheel steering mechanism is not varied by a force applied to a vehicle wheel from a road surface.

3. The rear wheel steering angle control apparatus according to claim 2, wherein the alerting determining unit allows a manual operation for setting the output of the rear wheel steering mechanism to the predetermined allowable range when the alerting determining unit alerts that the output of the rear wheel steering mechanism is not within the predetermined allowable range in a state where the observing unit detects the at least one abnormal condition.

4. The rear wheel steering angle control apparatus according to claim 1, wherein the alerting determining unit allows an only manual operation for setting the output of the rear wheel steering mechanism to the predetermined allowable range when the alerting determining unit alerts that the output of the rear wheel steering mechanism is not within the predetermined allowable range in a state where the observing unit detects the at least one abnormal condition.

5. The rear wheel steering angle control apparatus, according to claim 1, further comprising vehicle speed detecting means for detecting the vehicle speed.

6. The rear wheel steering angle control apparatus, according to claim 1, further comprising first and second vehicle speed sensors which detect the vehicle speed.

7. The rear wheel steering angle control apparatus, according to claim 1, wherein the alerting determining unit releases a vehicle speed restriction when the output of the rear wheel steering mechanism is within the predetermined allowable range when the observing unit detects the at least one abnormal condition.

8. The rear wheel steering angle control apparatus, according to claim 1, wherein the alert provided by the alerting determining unit is a visual alert.

9. The rear wheel steering angle control apparatus, according to claim 1, wherein the alert provided by the alerting determining unit is an auditory alert.

* * * * *